(12) United States Patent
Lu et al.

(10) Patent No.: US 9,583,751 B2
(45) Date of Patent: *Feb. 28, 2017

(54) BATTERY WITH AN ANODE PRELOAD WITH CONSUMABLE METALS

(71) Applicant: Sharp Laboratories of America, Inc., Camas, WA (US)

(72) Inventors: Yuhao Lu, Vancouver, WA (US); Long Wang, Vancouver, WA (US); Jong-Jan Lee, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 351 days.

This patent is subject to a terminal disclaimer.

(21) Appl. No.: 14/198,702

(22) Filed: Mar. 6, 2014

(65) Prior Publication Data

US 2014/0186707 A1 Jul. 3, 2014

Related U.S. Application Data

(63) Continuation of application No. 14/198,663, filed on Mar. 6, 2014, which is a continuation-in-part of
(Continued)

(51) Int. Cl.
*H01M 4/58* (2010.01)
*H01M 2/16* (2006.01)
(Continued)

(52) U.S. Cl.
CPC ........... *H01M 2/1686* (2013.01); *C01B 17/02* (2013.01); *C01B 19/02* (2013.01); *C01B 25/003* (2013.01);
(Continued)

(58) Field of Classification Search
CPC ........ H01M 4/58; H01M 4/04; H01M 4/5825; H01M 4/587; H01M 4/131; H01M 4/38; H01M 4/0495; Y01T 29/49108
See application file for complete search history.

(56) References Cited

U.S. PATENT DOCUMENTS

2012/0129056 A1* 5/2012 Majima ................... H01M 4/04
429/339
2012/0328936 A1* 12/2012 Wessells ............. H01M 10/054
429/188

OTHER PUBLICATIONS

V. D. Neff, "Some Performance Characteristics of a Prussian Blue Battery", Journal of Electrochemical Society 1985, 132, 1382-1384.
(Continued)

*Primary Examiner* — Emily Le
*Assistant Examiner* — Monique Wills
(74) *Attorney, Agent, or Firm* — Law Office of Gerald Maliszewski; Gerald Maliszewski

(57) ABSTRACT

A method is provided for fabricating a battery using an anode preloaded with consumable metals. The method forms an ion-permeable membrane immersed in an electrolyte. A preloaded anode is immersed in the electrolyte, comprising $Me_aX$, where X is a material such as carbon, metal capable of being alloyed with Me, intercalation oxides, electrochemically active organic compounds, and combinations of the above-listed materials. Me is a metal such as alkali metals, alkaline earth metals, and combinations of the above-listed metals. A cathode is also immersed in the electrolyte and separated from the preloaded anode by the ion-permeable membrane. The cathode comprises $M1_yM2_Z(CN)_N \cdot MH_2O$. After a plurality of initial charge and discharge operations are preformed, an anode is formed comprising $Me_bX$ overlying the current collector in a battery discharge state, where $0 \le b < a$.

19 Claims, 5 Drawing Sheets

Related U.S. Application Data application No. 14/193,782, filed on Feb. 28, 2014, which is a continuation-in-part of application No. 14/193,501, filed on Feb. 28, 2014, now Pat. No. 9,406,919, which is a continuation-in-part of application No. 14/174,171, filed on Feb. 6, 2014, now Pat. No. 9,455,431, which is a continuation-in-part of application No. 14/067,038, filed on Oct. 30, 2013, now Pat. No. 9,450,224, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, now Pat. No. 9,269,953.

(51) Int. Cl.

| | |
|---|---|
| *C01C 3/12* | (2006.01) |
| *H01M 4/136* | (2010.01) |
| *H01M 4/04* | (2006.01) |
| *H01M 4/62* | (2006.01) |
| *H02J 7/00* | (2006.01) |
| *H01M 4/134* | (2010.01) |
| *H01M 4/1395* | (2010.01) |
| *C01B 17/02* | (2006.01) |
| *C01B 19/02* | (2006.01) |
| *C01B 25/00* | (2006.01) |
| *C01B 31/00* | (2006.01) |
| *C01B 33/021* | (2006.01) |
| *C01D 1/02* | (2006.01) |
| *C01D 15/02* | (2006.01) |
| *H01M 4/131* | (2010.01) |
| *H01M 4/133* | (2010.01) |
| *H01M 4/1391* | (2010.01) |
| *H01M 4/38* | (2006.01) |
| *H01M 4/485* | (2010.01) |
| *H01M 4/505* | (2010.01) |
| *H01M 4/56* | (2006.01) |
| *H01M 4/587* | (2010.01) |
| *H01M 10/054* | (2010.01) |
| *H01M 10/0525* | (2010.01) |
| *H01M 10/0565* | (2010.01) |
| *H01M 4/1397* | (2010.01) |
| *H01M 10/052* | (2010.01) |

(52) U.S. Cl.
CPC ............ *C01B 31/00* (2013.01); *C01B 33/021* (2013.01); *C01C 3/12* (2013.01); *C01D 1/02* (2013.01); *C01D 15/02* (2013.01); *H01M 2/1653* (2013.01); *H01M 4/04* (2013.01); *H01M 4/0404* (2013.01); *H01M 4/049* (2013.01); *H01M 4/0416* (2013.01); *H01M 4/0452* (2013.01); *H01M 4/0471* (2013.01); *H01M 4/0495* (2013.01); *H01M 4/0497* (2013.01); *H01M 4/131* (2013.01); *H01M 4/133* (2013.01); *H01M 4/134* (2013.01); *H01M 4/136* (2013.01); *H01M 4/1391* (2013.01); *H01M 4/1395* (2013.01); *H01M 4/1397* (2013.01); *H01M 4/38* (2013.01); *H01M 4/381* (2013.01); *H01M 4/382* (2013.01); *H01M 4/387* (2013.01); *H01M 4/485* (2013.01); *H01M 4/505* (2013.01); *H01M 4/56* (2013.01); *H01M 4/58* (2013.01); *H01M 4/587* (2013.01); *H01M 4/5825* (2013.01); *H01M 4/628* (2013.01); *H01M 10/054* (2013.01); *H01M 10/0525* (2013.01); *H01M 10/0565* (2013.01); *H02J 7/0042* (2013.01); *H01M 10/052* (2013.01); *Y02E 60/122* (2013.01); *Y10T 29/49108* (2015.01)

(56) References Cited

OTHER PUBLICATIONS

N. Imanishi et al., "Lithium Intercalation Behavior into Iron Cyanide complex as Positive Electrode of Lithum Secondary Battery", Journal of Power Sources 1999, 79, 215-219.

Y. Lu, L. Wang, J. Cheng, and J. B. Goodenough, "Prussian Blue: a New FrameworK for Sodium Batteries", Chemistry Communications 2012, 48, 6544-6546.

L. Wang et al., "A Superior Low-Cost Cathode for a Na-ion Battery", Angewandte Chemie International Edition 2013, 52, 1964-1967.

A. Eftekhari, "Potassium Secondary Cell Based on Prussian Blue Cathode", Journal of Power Sources 2004, 126, 221-228.

C. D. Wesselis et al., "Copper Hexacyanoferrate Battery Electrodes with Long Cycle Life and High Powers", Nature Communications 2011, 2, Article No. 550.

C. D. Wessells et al., "Nickel Hexacyanoferrate Nanoparticie Electrodes for Aqueous Sodium and Potassium ion Batteries", Nano Letters 2011, 11, 5421-5425.

C. D. Wessells, et al., "The Effect of Insertion Species on Nanostructured Open Framework . . . ", Journal of the Electrochemical Society 2012, 159, A98-A103.

T. Matsuda, M. Takachi, and Y. Moritomo, "A Sodium Manganese Ferrocyanide Thin Film for Na-ion Batteries", Chemical Communications 2013, 49, 2750-2752.

S-H. Yu et al., "Iron Hexacyanoferrate Nanoparticles as Cathode Materials for Lithium and Sodium Rechargeable Batteries", ECS Electrochemistry Letters 2013, 2, A39-A41.

M. Hu, J. S. Jiang, "Facile Synthesis of Air-Stable Prusian White Microcubes via a Hydrothermal Method", Materials Research Bulletin 2011, 46, 702-707.

S-H. Lee and Y-D. Huh, "Preferential Evolution of Prussian Blue's Morphology from Cube to Hexapod", The Bulletin of the Korean Chemical Society 2012, 33, 1078-1080.

M. Hu, J-S. Jiang, C-C. Lin, and Y. Zeng, "Prussian Blue Mesocrystals: an Example of Self-Construction", CrystEngComm 2010, 12, 2679-2683.

M. Hu, R-P. Ji, and J-S. Jiang, "Hydrothermal Synthesis of Magnetite Crystals: from Sheet to Pseudo-Octahedron", Materials Research Bulletin 2010, 45, 1811-1715.

* cited by examiner

BATTERY WITH AN ANODE PRELOAD WITH CONSUMABLE METALS

RELATED APPLICATIONS

This application is a Continuation-in-Part of an application entitled, BATTERY ANODE WITH PRELOADED METALS, invented by Long Wang et al, Ser. No. 14/198,663, filed Mar. 6, 2014;

which is a Continuation-in-Part of an application entitled, METAL BATTERY ELECTRODE WITH PYROLYZED COATING, invented by Yuhao Lu et al, Ser. No. 14/193,782, filed Feb. 28, 2014;

which is a Continuation-in-Part of an application entitled, METAL HEXACYANOMETALLATE ELECTRODE WITH SHIELD STRUCTURE, invented by Yuhao Lu et al, Ser. No. 14/193,501, filed Feb. 28, 2014;

which is a Continuation-in-Part of an application entitled, CYANOMETALLATE CATHODE BATTERY AND METHOD FOR FABRICATION, invented by Yuhao Lu et al, Ser. No. 14/174,171, filed Feb. 6, 2014;

This application is a Continuation-in-Part of an application entitled, SODIUM IRON(II)-HEXACYANOFERRATE(II) BATTERY ELECTRODE AND SYNTHESIS METHOD, invented by Yuhao Lu et al, Ser. No. 14/067,038, filed Oct. 30, 2013;

which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013;

which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013;

which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical cells and, more particularly, to a method of fabrication and associated battery with an anode that is preloaded with consumable metals.

2. Description of the Related Art

The rechargeable lithium ion battery (LIB) has triggered the portable electronic devices revolution due to its high power density, long cycling life, and environmental compatibility. The rechargeable LIB consists of a cathode (positive electrode) and an anode (negative electrode), separated by a $Li^+$-ion permeable membrane. A solution or polymer containing lithium-ions is also used in the battery so that $Li^+$-ions can "rock" back and forth between the positive and negative electrode freely. The positive materials are typically transition-metal oxides such as lithium cobalt oxide ($LiCoO_2$), lithium manganese oxide ($LiMn_2O_4$), lithium iron phosphate ($LiFePO_4$), and their derivatives. Lithium-ions can move in their interstitial space freely and reversibly. The negative electrode materials can use lithium-metal, alloys, and carbonaceous materials. During discharge, $Li^+$-ions are extracted from the negative electrode and inserted into the positive electrode. In the meantime, electrons pass through an external circuit from the negative electrode to the positive electrode and generate electric power. During a charge, ions and electrons move along the reverse direction and go back to their original places.

Although LIBs have been successfully used, the conflict between lithium demand and its scarcity surges its cost, which hinders the further application of lithium-ion batteries on a large scale. Therefore, a low-cost rechargeable battery is urgently needed as an alternative to expensive LIBs. Under the circumstance, sodium-ion batteries are attracting more attention because sodium has very similar properties to lithium, but a cheaper cost. Like lithium-ion batteries, sodium-ion batteries need $Na^+$-host materials as their electrode. Much effort has been expended to directly duplicate the $Li^+$-host structures, using $Na^+$-host electrode materials for the sodium-ion batteries. For example, $NaCoO_2$, $NaMnO_2$, $NaCrO_2$ and $Na_{0.85}Li_{0.17}Ni_{0.21}Mn_{0.64}O_2$, all having a layered-structure similar to $LiCoO_2$, have been developed for sodium-ion batteries. Similarly, $Co_3O_4$ with a Spinel structure, $Na_3V_2(PO_4)_3$ with a NASICON structure, and $NaFePO_4$ with an Olivine structure have been employed in sodium batteries. In addition, sodium fluorophosphates, such as $Na_2PO_4F$, $NaVPO_4F$ and $Na_{1.5}VOPO_4F_{0.5}$, have also used as the positive electrode in sodium batteries.

However, it is impractical to copy the structures of $Li^+$-host compounds for $Na^+$ or $K^+$-host compounds. Sodium and potassium ions are much larger than lithium ions, and severely distort the structure of the $Li^*$-host compounds. Thus, it is very important for the advancement of sodium/potassium-ion batteries to develop new $Na^+/K^+$-host materials with large interstitial spaces in which sodium/potassium-ions can easily and reversibly move. $Na^+/K^+$— ions have been observed to intercalate into metal cyanide compounds. Transition metal hexacyanoferrates (TMHCFs) with large interstitial spaces have been investigated as cathode materials for rechargeable lithium-ion batteries [1,2], sodium-ion batteries [3,4], and potassium-ion batteries [5]. With an aqueous electrolyte containing proper alkali-ions or ammonium-ions, copper and nickel hexacyanoferrates [(Cu, Ni)-HCFs]demonstrated robust cycling life with 83% capacity retention after 40,000 cycles at a charge/discharge current of 17C [6-8]. In spite of this, the materials demonstrated low capacities and energy densities because (1) only one sodium-ion can be inserted/extracted into/from per Cu-HCF or Ni-HCF formula, and (2) these TM-HCFs electrodes must be operated below 1.23 V due to the water electrochemical window. The electrochemical window of a substance is the voltage range between which the substance is neither oxidized nor reduced. This range is important for the efficiency of an electrode, and once out of this range, water becomes electrolyzed, spoiling the electrical energy intended for another electrochemical reaction.

In order to compensate for such shortcomings, manganese hexacyanoferrate (Mn-HCF) and iron hexacyanoferrate (Fe-HCF) have been used as cathode materials in a non-aqueous electrolyte [9, 10]. When assembled with a sodium-metal anode, Mn-HCF and Fe-HCF electrodes cycled between 2.0V and 4.2 V delivered capacities of ~110 mAh/g.

FIG. 1 is a diagram depicting the crystal structure of a metal hexacyanometallate (MHCM) (prior art). The aforementioned TMHCFs can be categorized into a more general group of MHCMs that have the open framework as shown. In general, Berlin Green and its analogues can be expressed as $M1_YM2_Z(CN)_N$, where $M1^{m+}$ and $M2^{n+}$ are transition metals with different or same formal oxidation numbers (m and n). M1 and M2 may be (Ti), vanadium (V), chromium (Cr), manganese (Mn), iron (Fe), cobalt (Co), nickel (Ni), copper (Cu), zinc (Zn), Ca, Mg, strontium (Sr), or barium (Ba). The ratio of $M_1$ and $M_2$ can vary. In the case of Berlin Green, M1 and M2 are both Fe. In addition, various amounts of water ($H_2O$) can be stayed in their interstitial or lattice positions.

Without the interstitial ions, Berlin Green and its analogues can be used as cathode in any metal-ion batteries. The electrochemical reactions during discharge can be expressed as follows, Cathode:

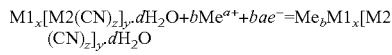

Anode:

Where Me is the alkali, alkaline earth, or aluminum, and Me–Ø is the metal loaded anode that has been described in parent application entitled, BATTERY ANODE WITH PRE-LOADED METALS, Ser. No. 14/198,663, which is incorporated herein by reference.

It would be advantageous if a metal-ion battery with a cathode of Berlin Green or its analogues could be made with a metal preloaded in the anode, for higher energy, longer cycling life, and lower costs.

[1] V. D. Neff, "Some Performance Characteristics of a Prussian Blue Battery", *Journal of Electrochemical Society* 1985, 132, 1382-1384.

[2] N. Imanishi, T. Morikawa, J. Kondo, Y. Takeda, O. Yamamoto, N. Kinugasa, and T. Yamagishi, "Lithium Intercalation Behavior into Iron Cyanide Complex as Positive Electrode of Lithium Secondary Battery", *Journal of Power Sources* 1999, 79, 215-219.

[3] Y. Lu, L. Wang, J. Cheng, and J. B. Goodenough, "Prussian Blue: a New Framework for Sodium Batteries", *Chemistry Communications* 2012, 48, 6544-6546.

[4] L. Wang, Y. Lu, J. Liu, M. Xu, J. Cheng, D. Zhang, and J. B. Goodenough, "A Superior Low-Cost Cathode for a Na-ion Battery", *Angewandte Chemie International Edition* 2013, 52, 1964-1967.

[5] A. Eftekhari, "Potassium Secondary Cell Based on Prussian Blue Cathode", *Journal of Power Sources* 2004, 126, 221-228.

[6] C. D. Wessells, R. A. Huggins, and Y. Cui, "Copper Hexacyanoferrate Battery Electrodes with Long Cycle Life and High Power", *Nature Communications* 2011, 2, Article number: 550.

[7] C. D. Wessells, S. V. Peddada, R. A. Huggins, and Y. Cui, "Nickel Hexacyanoferrate Nanoparticle Electrodes for Aqueous Sodium and Potassium Ion Batteries", *Nano Letters* 2011, 11, 5421-5425.

[8] C. D. Wessells, S. V. Peddada, M. T. McDowell, R. A. Huggins, and Y. Cui, "The Effect of Insertion Species on Nanostructured Open Framework Hexacyanoferrate Battery Electrodes", *Journal of the Electrochemical Society* 2012, 159, A98-A103.

[9] T. Matsuda, M. Takachi, and Y. Moritomo, "A Sodium Manganese Ferrocyanide Thin Film for Na-ion Batteries", *Chemical Communications* 2013, 49, 2750-2752.

[10] S—H. Yu, M. Shokouhimehr, T. Hyeon, and Y-E. Sung, "Iron Hexacyanoferrate Nanoparticles as Cathode Materials for Lithium and Sodium Rechargeable Batteries", *ECS Electrochemistry Letters* 2013, 2, A39-A41.

SUMMARY OF THE INVENTION

Disclosed herein is a metal-ion battery with a transition metal hexacyanometallate (TMHCM) cathode and a metal-loaded anode separated by a metal-ion permeable membrane. The membrane can be a liquid electrolyte-soaked separator, polymer, gel, or solid electrolyte. The materials for the positive electrode (cathode) are Berlin Green or its analogues ($M1_YM2_Z(CN)_N \cdot MH_2O$), where M1 and M2 are the same or different metal ions, such as (Ti), vanadium (V), chromium (Cr), manganese (Mn), iron (Fe), cobalt (Co), nickel (Ni), copper (Cu), zinc (Zn), Ca, Mg, strontium (Sr), or barium (Ba). The materials for the negative electrode (anode) are metal-loaded materials, such as carbonaceous materials (C), metals capable of being alloyed (tin (Sn)), antimony (Sb), lead (Pb), etc.), phosphorus, oxides ($Sb_2O_4$, $Li_4Ti_5O_{12}$, $Na_{2+x}Ti_3O_7$, $TiO_2$, $VO_2$, $Na_{4+x}Ti_5O_{12}$, $Ti_2(PO_4)_3$, $NiCo_2O_4$, etc.), sulfides ($Ni_3S_2$, $FeS_2$, $Na_xTiS_2$, $Na_xVS_2$, etc.), organic compounds (organosulfide polymer, organic free radical compounds, organic carbonyl compounds, conducting polymer), and $FeF_3$. The metals loaded in the anode can be lithium (Li), sodium (Na), potassium (K), rubidium (Rb), cesium (Cs), calcium (Ca), strontium (Sr), barium (Ba), gold (Ag), aluminum (Al), and magnesium (Mg).

Accordingly, a method is provided for fabricating a battery using an anode preloaded with consumable metals. The method forms an ion-permeable membrane immersed in an electrolyte. A preloaded anode is immersed in the electrolyte and comprises $Me_aX$. X is a material such as carbon, metals capable of being alloyed with Me, intercalation oxides, electrochemically active organic compounds, or combinations of the above-listed materials. Me is a metal such as alkali metals, alkaline earth metals, or combinations of the above-listed metals. A cathode is also immersed in the electrolyte and separated from the preloaded anode by the ion-permeable membrane. The cathode comprises $M1_YM2_Z(CN)_N \cdot MH_2O$:

where M1 and M2 are transition metals;
where Y is less than or equal to 1;

where z is less than or equal to 1;

where N is less than or equal to 6; and, where M is less than or equal to 20.

A plurality of initial charge and discharge operations are performed. A charge operation uses an external power source to create a current from the preloaded anode to the cathode, and a discharge operation connects an external load between the preloaded anode and cathode. As a result, an anode is formed comprising $Me_bX$ overlying the current collector in a battery discharge state, where $0 \leq b < a$.

Subsequent to performing the plurality of initial charge and discharge operations, the cathode formed in a battery discharged state comprises $Me_xM1_YM2_Z(CN)_N \cdot MH_2O$, where X is greater than zero.

In one case, if the performance of initial the charge and discharge operations consumes the metal (Me) in the preloaded anode, the anode formed in the battery charged state comprises $Me_cX$, where $c < a$. Further, solid electrolyte interface (SEI) layers are formed overlying the anode, the cathode, or both the anode and cathode. Otherwise, if the Me metal is not consumed, the anode formed in the battery charged state comprises $Me_aX$. Either way, the anode formed in the battery charged state comprises either X with intercalated Me metal ions or X alloyed with Me metal.

Additional details of the above-described method, a battery with a preloaded anode, and a battery with a steady state capacity are presented below.

DETAILED DESCRIPTION

Figure 2:
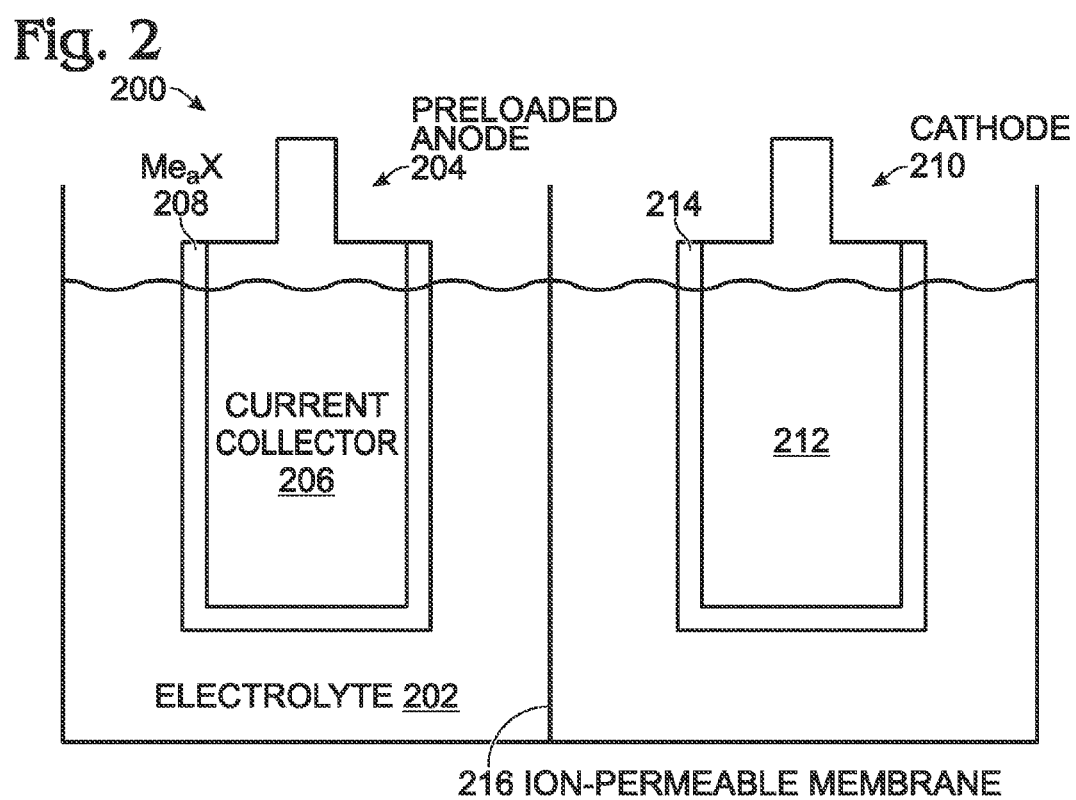
FIG. 2 is a partial cross-sectional view of a preloaded battery with an anode preloaded with consumable metals.

FIG. 2 is a partial cross-sectional view of a preloaded battery with an anode preloaded with consumable metals. The preloaded battery 200 comprises an electrolyte 202 and a preloaded anode 204. The preloaded anode 204 comprises a conductive current collector 206 with $Me_aX$ 208 overlying the current collector. X is a material such as carbon, metals able to be electrochemically alloy with metal (Me), intercalation oxides, electrochemically active organic compounds, and combinations of the above-listed materials. Me is a metal such as alkali metals, alkaline earth metals, and a combination of alkali and alkaline earth metals.

The cathode 210 comprises a conductive current collector 212 with $M1_YM2_Z(CN)_N \cdot MH_2O$ 214 overlying the current collector, where:

M1 and M2 are transition metals;

X is less than or equal to 2;

Y is less than or equal to 1;

Z is less than or equal to 1;

N is less than or equal to 6; and,

M is less than or equal to 20.

An ion-permeable membrane 216, immersed in the electrolyte, is interposed between the anode 204 and the cathode 210.

More explicitly, Me may be one of the following metals: lithium (Li), sodium (Na), potassium (K), rubidium (Rb), cesium (Cs), calcium (Ca), strontium (Sr), barium (Ba), silver (Ag), aluminum (Al), or magnesium (Mg). M1 and M2 are each independently derived, meaning they may be the same or different metals, and are typically one of the following: titanium (Ti), vanadium (V), chromium (Cr), manganese (Mn), iron (Fe), cobalt (Co), nickel (Ni), copper (Cu), zinc (Zn), Ca, Mg, strontium (Sr), or barium (Ba).

A short list of possible $Me_aX$ 208 materials are as follows:

$Li_RVO_2$, where $0 < R < 1$;

$Na_SMnO_2$, where $0 < s < 1$;

a Na—Sn alloy;

a mixture of lithium powder and tin particles;

a mixture of sodium particles and hard carbon powder;

a compound of hard carbon and lithium;

a compound of hard carbon and sodium;

a Li—Sn alloy;

a Li—Sb alloy;

a Na—Sb alloy;

a compound of $Fe_3O_4$ and Li; and, a compound of $Fe_3O_4$ and Na.

Other materials include $Sb_2O_4$, $Li_4Ti_5O_{12}$, $Na_{2+x}Ti_3O_7$, $TiO_2$, $VO_2$, $Na_{4+x}Ti_5O_{12}$, $Ti_2(PO_4)_3$, $NiCo_2O_4$, $Ni_3S_2$, $FeS_2$, $Na_xTiS_2$, $Na_xVS_2$, and $FeF_3$.

It should be understood that the battery 200 may be enabled using other $Me_aX$ 208 materials, using the general categories of X and Me materials listed above, as would be understood by one with ordinary skill in the art.

Not shown, a polymeric binder such as polytetrafluoroethylene (PTFE) or polyvinylidene difluoride (PVDF) may be used to provide adhesion between electrode materials and current collectors to improve the overall physical stability.

The electrolyte 202 may be non-aqueous, such as an organic liquid electrolyte, or alternatively, gel electrolyte, polymer electrolyte, solid (inorganic) electrolyte, etc. Common examples of non-aqueous (liquid) electrolytes include organic carbonates such as ethylene carbonate (EC), propylene carbonate (PC), diethyl carbonate (DEC), etc., although many other organic carbonates and alternatives to organic carbonates exist. Typically, gel electrolytes consist of polymeric materials which have been swelled in the presence of liquid electrolytes. Examples of polymers employed as gel electrolytes include, but are not limited to, poly(ethylene)oxide (PEO) and fluorinated polymers such as poly(vinylidene) fluoride (PVDF)-based polymers and copolymers, etc. In contrast, (solid) polymer electrolytes may be prepared using the same classes of polymers for forming gel electrolytes although swelling of the polymer in liquid electrolytes is excluded. Finally, solid inorganic (or ceramic) materials may be considered as electrolytes, which may be employed in combination with liquid electrolytes. Overall, the appropriate electrolyte system may consist of combinations (hybrid) of the above classes of materials in a variety of configurations. In some instances not shown, the ion-permeable membrane 216 and the electrolyte 202 can be the same material, as may be the case for polymer gel, polymer, and solid electrolytes.

Figure 3A:
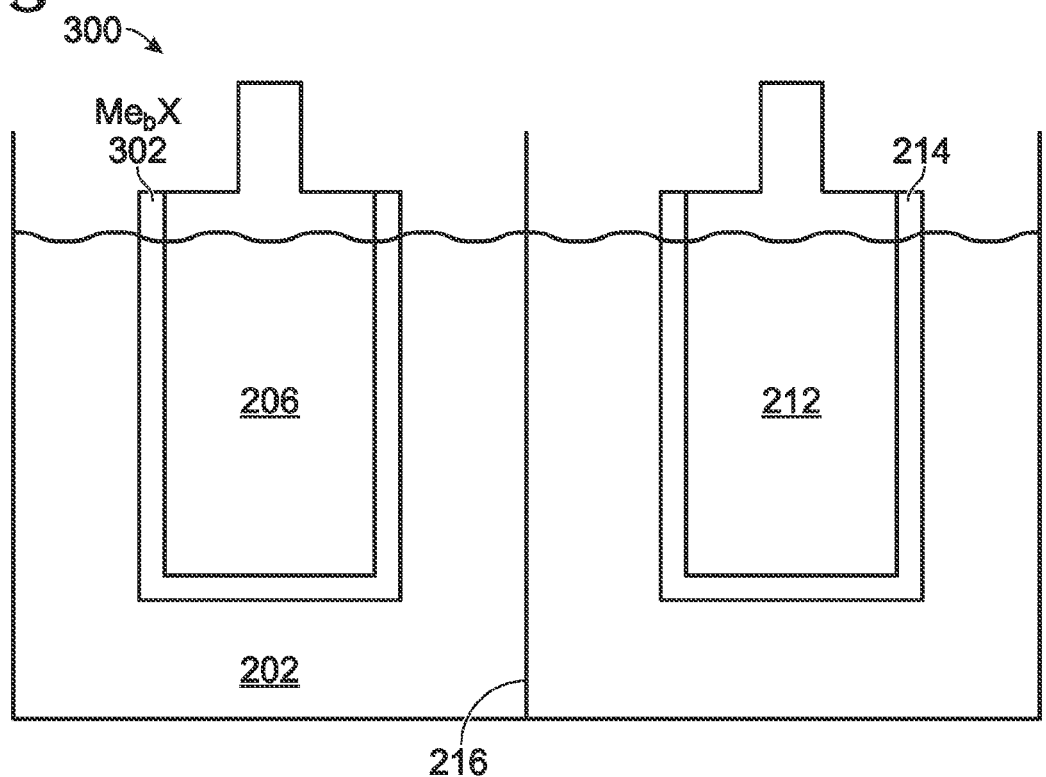
FIGS. 3A and 3B are partial cross-sectional views of a battery with a steady state capacity.
Figure 3B:
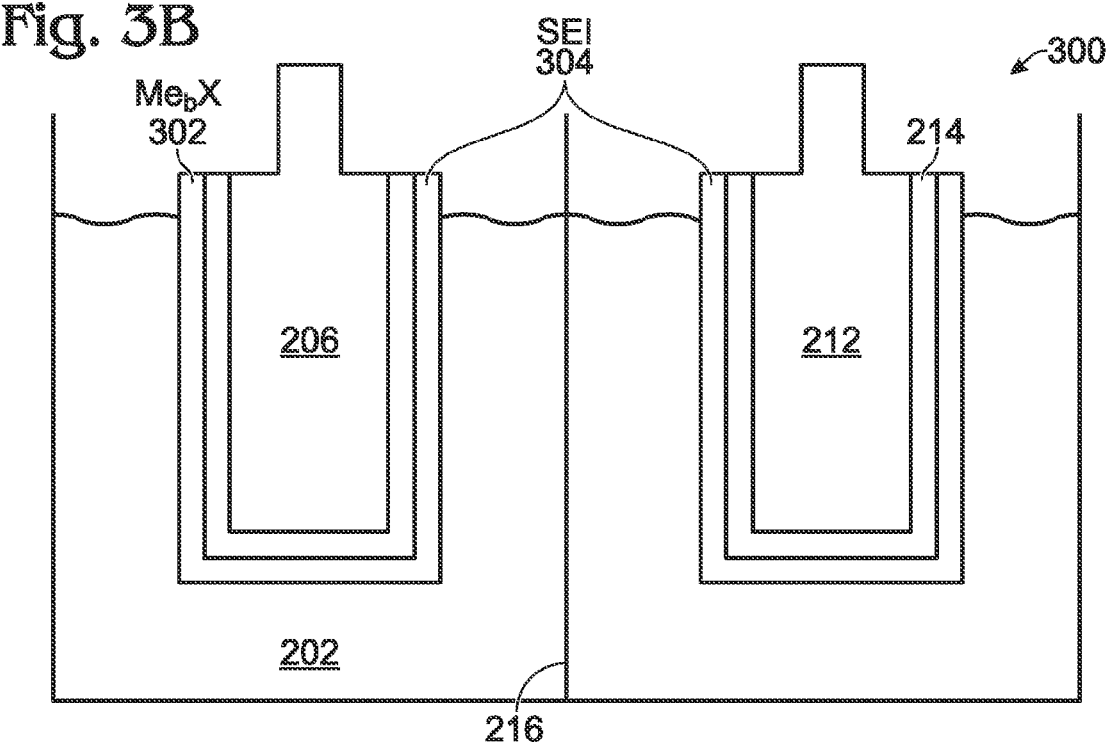

FIGS. 3A and 3B are partial cross-sectional views of a battery with a steady state capacity. The battery 300 comprises an electrolyte 202 and an ion-permeable membrane 216, as described above in the explanation of FIG. 2. In short, the battery 300 may be described as having an initial condition or initial capacity, and a steady state condition or steady state capacity. The anode and cathode in the initial condition are as described in the explanation of FIG. 2, and their description is not repeated here in the interest of brevity.

In the steady state discharged condition, which occurs after a plurality of initial charge and discharge cycles, $Me_bX$ 302 overlies the anode current collector 206, where $0 \leq b < a$. When charged in either the initial condition or steady state condition, assuming no SEI layer exists over the cathode, $M1_YM2_Z(CN)_N \cdot mH_2O$ 214 overlies the cathode current collector 212. The cathode 210, discharged in the steady state condition, comprises:

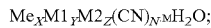

$$Me_XM1_YM2_Z(CN)_N \cdot mH_2O;$$

where X is greater than zero.

In one aspect, as shown in FIG. 3B, a solid state interface (SEI) 304 may overlie the electrodes in the steady state condition, meaning that some Me material has been consumed during the initial charge/discharge cycles. Although SEI 304 is shown as overlying both the cathode 210 and the anode 204 in this figure, it should be understood that SEI, if it forms at all, may form on just the anode or just the cathode. In this aspect, when the anode 204 is charged in the steady state condition, it comprises $Me_cX$, where $c < a$.

SEI formation depends on the potentials of the anodes. For example, $Li_4Ti_5O_{12}$ may be used as the anode in a sodium ion battery. Its potential is about 1V (vs. Na), at which potential no SEI layer forms on the anode. In absence of SEI layers (FIG. 3A), the anode 204 charged in the steady state condition comprises $Me_aX$. Either with or without SEI layers, the anode 204 charged in the steady state condition, comprises either X with intercalated Me metal ions or X alloyed with Me metal.

Figure 1:
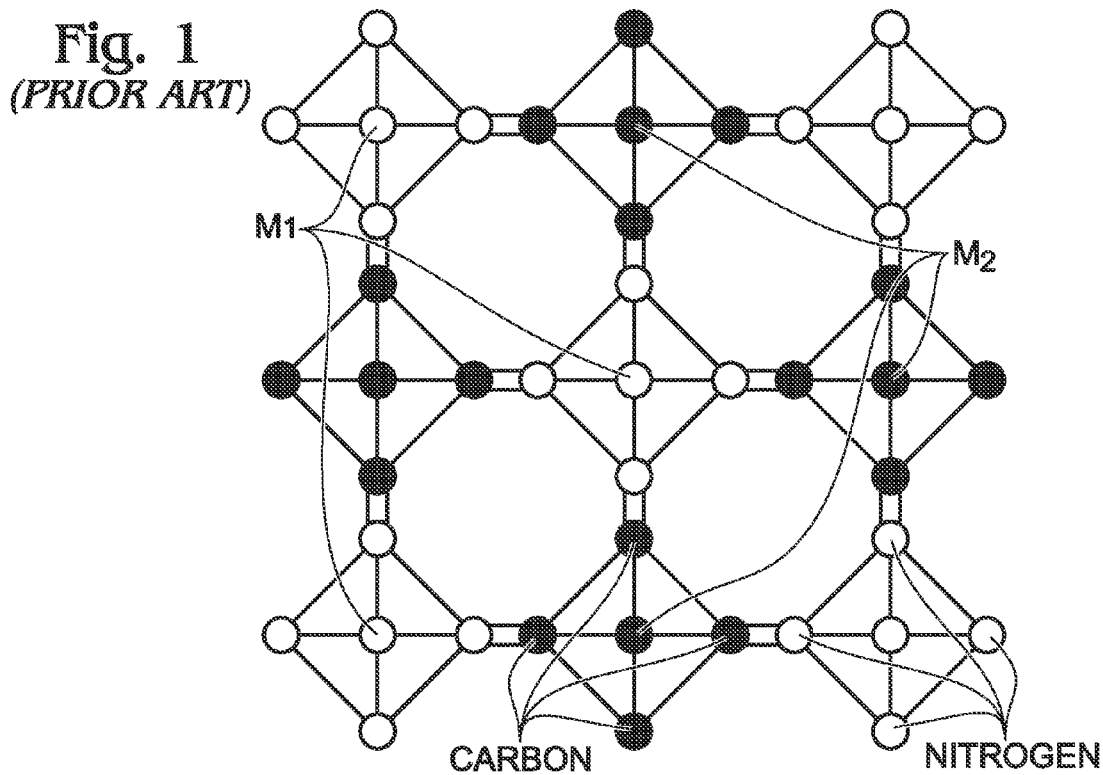
FIG. 1 is a diagram depicting the crystal structure of a metal hexacyanometallate (MHCM) (prior art).

The positive electrode (cathode) in FIGS. 2, 3A, and 3B may be Berlin Green or one of its analogues, $M1_YM2_Z(CN)_N \cdot mH_2O$. The materials $M1_YM2_Z(CN)_N \cdot mH_2O$ demonstrate frameworks that consist of M1-N—C-M2 skeletons and large interstitial space as shown in FIG. 1. Metal-ions can easily and reversibly move into their interstitial spaces. Metal-loaded anode materials can be one of carbonaceous materials, oxides, sulfides, or nitrides. As mentioned above, the metals can be Li, Na, K, Rb, Cs, Mg, Ca, Sr, Ba, Ag, or Al. In order to obtain a high voltage for the battery, a non-aqueous electrolyte, such as organic electrolyte, gel electrolyte, polymer electrolyte, or solid electrolyte may be used.

Figure 4:
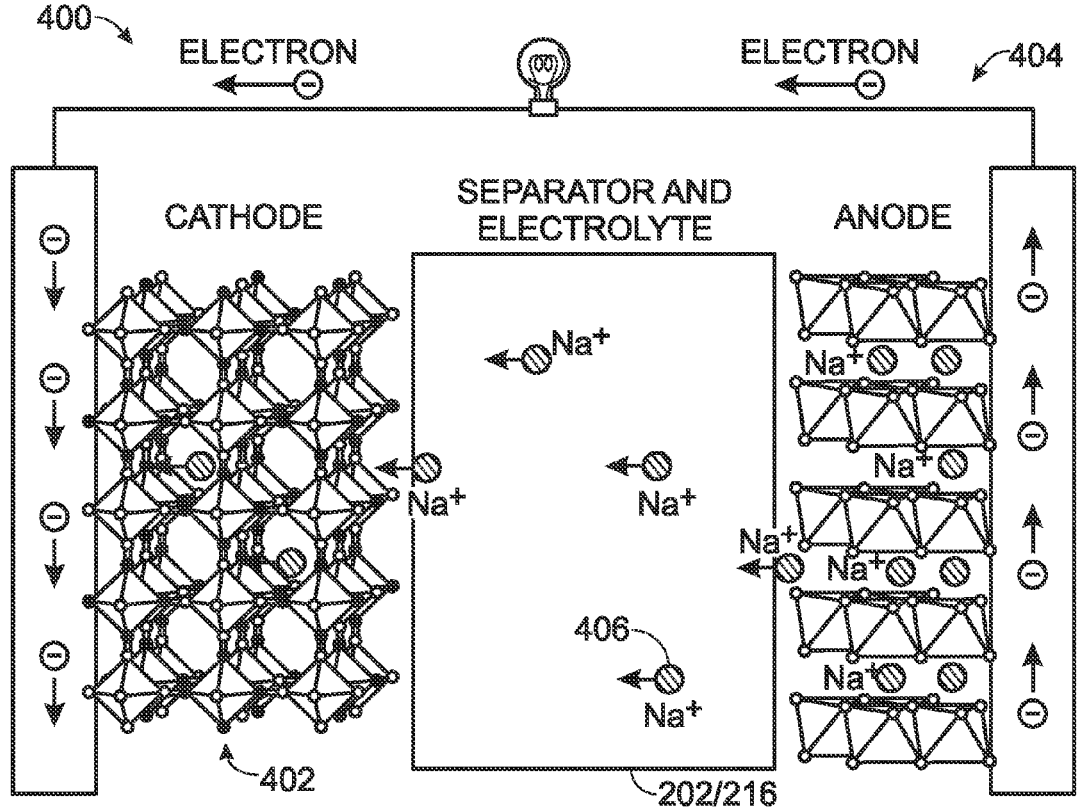
FIG. 4 is a partial cross-section view of an exemplary sodium-ion battery (NIB) with a Berlin Green cathode and a sodium-loaded hard carbon anode, as it is discharging.

FIG. 4 is a partial cross-section view of an exemplary sodium-ion battery (NIB) 400 with a Berlin Green cathode 402 and a sodium-loaded hard carbon anode 404, as it is discharging. The positive electrode (cathode) 402 comprises $Fe_YFe_Z(CN)_N \cdot mH_2O$ and a sodium-loaded negative electrode (anode) 404 is separated from the cathode by a $Na^+$-ion permeable membrane 216. To obtain a high voltage, a $Na^+$ soluble non-aqueous solution, polymer, gel or all-solid electrolyte 202 is used in the NIB 400. Meanwhile, the sodium-loaded negative electrode 404 can be selected from carbonaceous materials, oxides, sulfides, and so on. The sodium-ion battery 400 is discharged first. The $Na^+$-ions 406 are disassociated from the sodium-loaded anode 404 and inserted into the Berlin Green cathode 402. The reactions in the battery are:

at the positive electrode

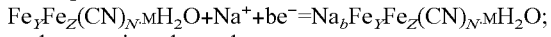

$$Fe_YFe_Z(CN)_N \cdot mH_2O + Na^+ + be^- = Na_bFe_YFe_Z(CN)_N \cdot mH_2O;$$

at the negative electrode

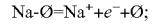

$$Na\text{-}\varnothing = Na^+ + e^- + \varnothing;$$

where Ø is hard carbon.

Here, sodium has been electrochemically loaded onto/into hard carbon before assembled into the cell with the Berlin Green cathode.

Figure 5:
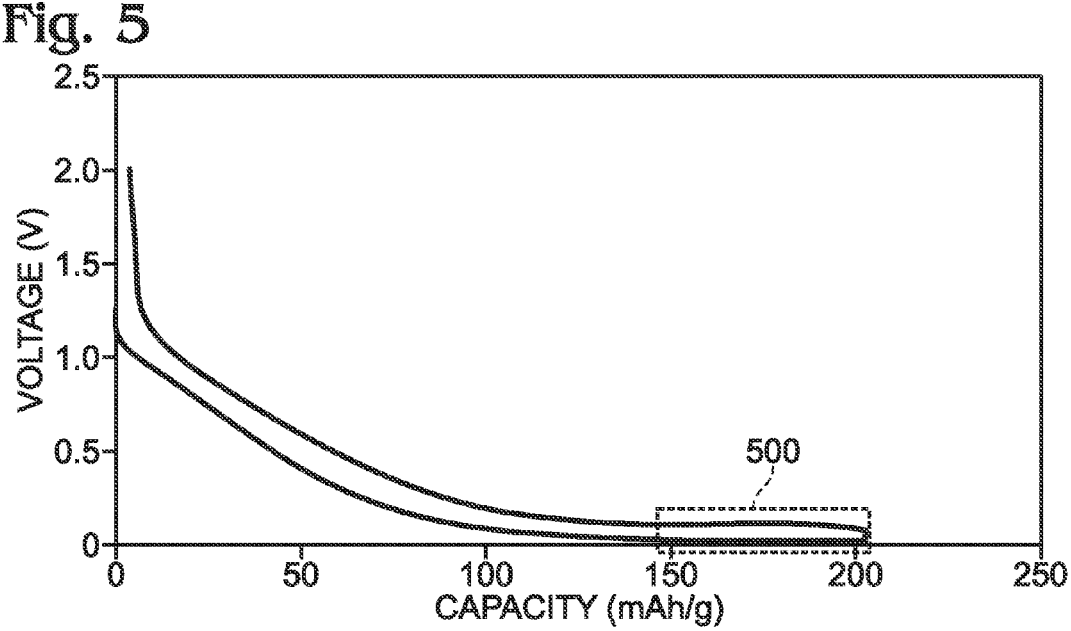
FIG. 5 is a graph depicting the behavior of the hard carbon anode with the sodium counter electrode.

FIG. 5 is a graph depicting the behavior of the hard carbon anode with the sodium counter electrode. Before the hard carbon was put into the full (steady state condition) cell, it was cycled five times, and then discharged to 5 millivolts (mV), which made the hard carbon electrode stable and fully sodiated. To assemble the full cell, "excess" hard carbon was used, so the Berlin Green electrode determined the capacity of the full cell. In the full cell, hard carbon electrode capacity at low voltage is indicated in region 500.

There are two purposes for the use of excess hard carbon, or in general, excess X material. One is to use its plateau at a low voltage, as indicated in FIG. 5. The other is that the excess hard carbon ensures that all sodium-ions from cathode are able to totally intercalate into the hard carbon electrode, so that no sodium dendrite forms on the anode surface. However, the various X materials used in the anode have different behaviors, and it is not necessary that all types of anode materials be in excess, as compared to the cathode, in full cells.

Figure 6A:
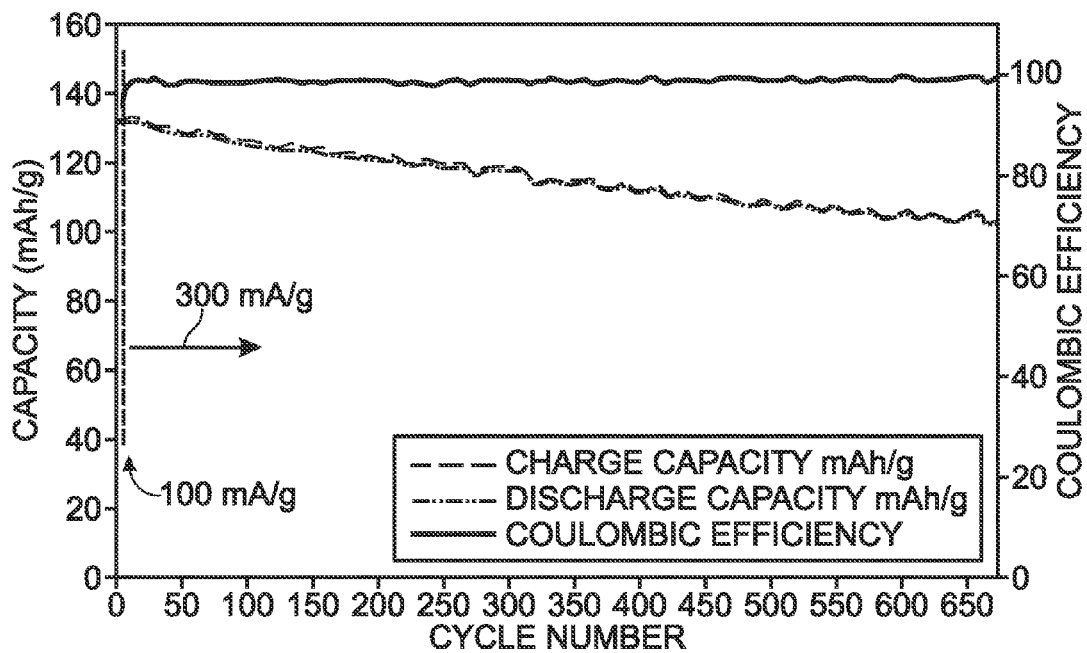
FIGS. 6A and 6B depict the capacitance of a full cell using a Berlin Green cathode and a sodium-loaded hard carbon anode.
Figure 6B:
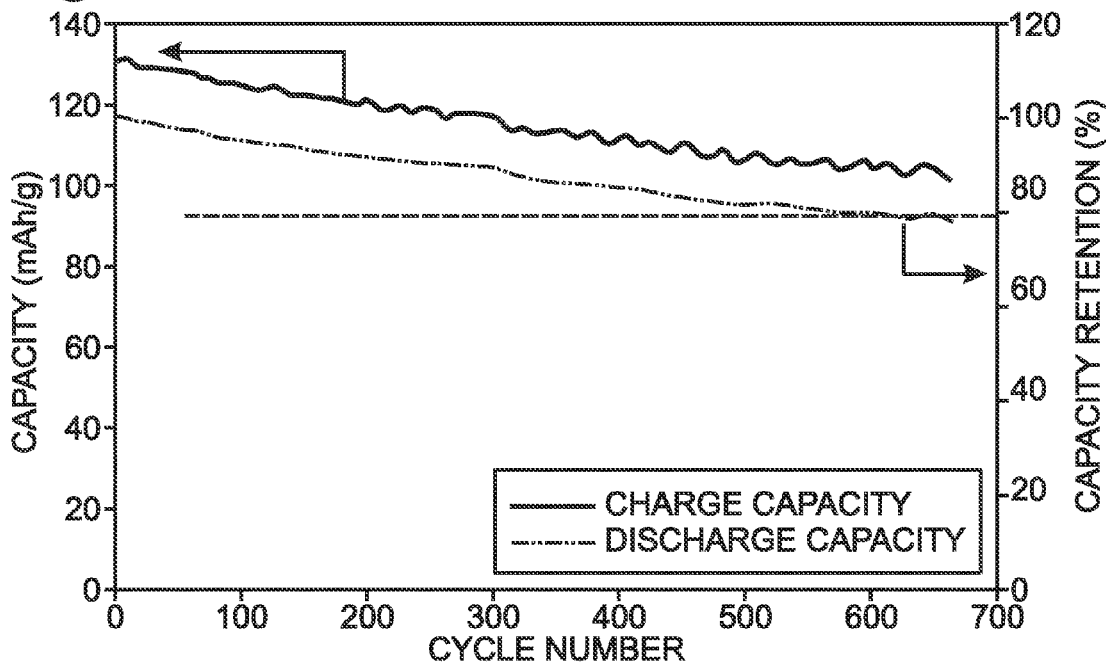

FIGS. 6A and 6B depict the capacitance of a full cell using a Berlin Green cathode and a sodium-loaded hard carbon anode. In FIG. 6A, with the charge/discharge current of 100 mAh/g, the cell in its initial condition delivered a capacity of ~138 milliamp hours per gram (mAh/g). After 9 cycles (steady state condition), the current increased to 300 mA/g, and the capacity decreased to ~131 mAh/g. After 665 cycles the capacity retained was still above 104 mAh/g. FIG. 6A demonstrates the capacity retention of the full cell with the current of 300 mA/g. The initial 9 cycles with the current of 100 mA/g have been subtracted in FIG. 6B. The experimental result shows that the capacity was 80.1% of the initial capacity at the 656th cycle with the current of 300 mA/g.

Figure 7:
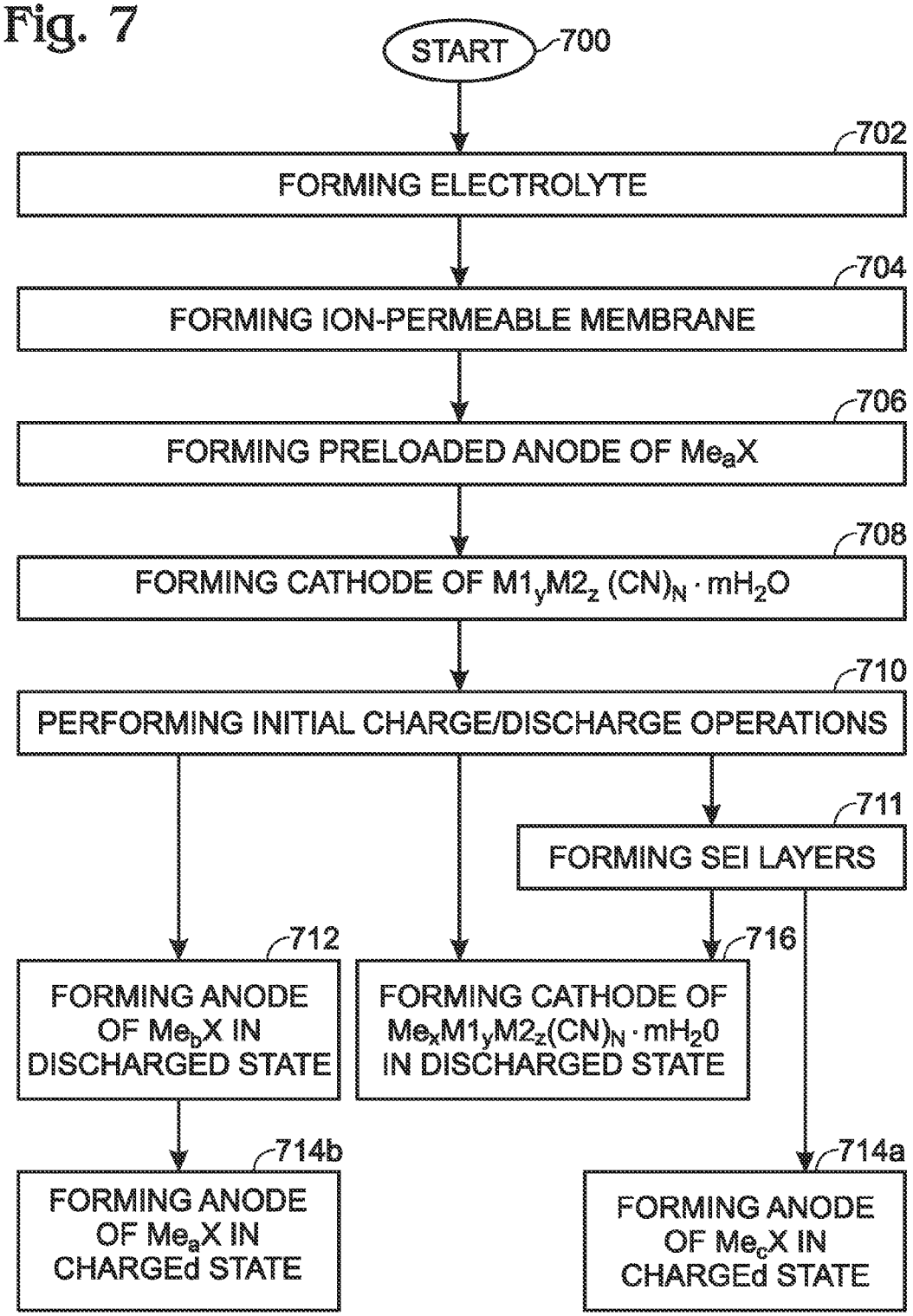
FIG. 7 is a flowchart illustrating a method for fabricating a battery using an anode preloaded with consumable metals.

FIG. 7 is a flowchart illustrating a method for fabricating a battery using an anode preloaded with consumable metals. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The descriptions of FIGS. 2, 3A, and 3B aid in the understanding of the method described below. The method starts at Step 700.

Step 702 forms an electrolyte. Step 704 forms an ion-permeable membrane immersed in the electrolyte. Step 706 forms a preloaded anode immersed in the electrolyte, comprising $Me_aX$. X is a material such as carbon, metal capable of being alloyed with Me, intercalation oxides, electrochemically active organic compounds, or combinations of the above-listed materials. Me is a metal such as alkali metals, alkaline earth metals, or combinations of the above-listed metals. Step 708 forms a cathode immersed in the electrolyte and separated from the preloaded anode by the ion-permeable membrane. The cathode comprises $M1_YM2_Z(CN)_N \cdot mH_2O$:
- where M1 and M2 are transition metals;
- where $Y$ is less than or equal to 1;
- where $Z$ is less than or equal to 1;
- where $N$ is less than or equal to 6; and,
- where $M$ is less than or equal to 20.

More explicitly, Me may be lithium (Li), sodium (Na), potassium (K), rubidium (Rb), cesium (Cs), calcium (Ca), strontium (Sr), barium (Ba), gold (Ag), aluminum (Al), or magnesium (Mg). M1 and M2 are each independently derived, and are typically titanium (Ti), vanadium (V), chromium (Cr), manganese (Mn), iron (Fe), cobalt (Co), nickel (Ni), copper (Cu), zinc (Zn), Ca, Mg, strontium (Sr), or barium (Ba).

Step 710 performs a plurality of initial charge and discharge operations. A charge operation uses an external power source to create a current from the preloaded anode to the cathode, and a discharge operation connects an external load between the preloaded anode and cathode. Step 712 forms an anode comprising $Me_bX$ overlying the current collector in a battery discharge state, where $0 \le b < a$. Subsequent to performing the plurality of initial charge and discharge operations in Step 710, Step 716 forms a cathode in a battery discharged state comprising $Me_XM1_YM2_Z(CN)_N \cdot mH_2O$, where X is greater than zero.

In one aspect, performing the plurality of initial charge and discharge operations in Step 710 includes consuming the metal (Me) in the preloaded anode. Then, Step 711 forms SEI layers overlying the anode, the cathode, or both the anode and cathode. In this aspect, Step 714a forms an anode in the battery charged state comprising $Me_cX$, where $c<a$. Alternatively, in the absence of Step 711, Step 714b forms an anode in the battery charged state comprising $Me_aX$. With or without the SEI layer(s), Steps 714a and 714b both form an anode in the battery charged state comprising X with intercalated Me metal ions or X alloyed with Me metal.

A battery and associated fabrication method using an anode preloaded with consumable metals, and a battery with a steady state capacity have been provided. Examples of particular materials and process steps have been presented to illustrate the invention. However, the invention is not limited to merely these examples. Other variations and embodiments of the invention will occur to those skilled in the art.

We claim:

1. A method for fabricating a battery using an anode preloaded with consumable metals, the method comprising:
   forming an electrolyte;
   forming an ion-permeable membrane immersed in the electrolyte;
   forming preloaded anode immersed in the electrolyte, comprising $Me_aX$, where X is a material selected from the group consisting of carbon, metal capable of being alloyed with Me, intercalation oxides, electrochemically active organic compounds, and combinations of the above-listed materials, and Me is a metal selected from the group consisting of alkali metals, alkaline earth metals, silver (Ag), aluminum (Al), and a combination of the above-listed metals;
   forming a cathode immersed in the electrolyte and separated from the preloaded anode by the ion-permeable membrane, where the cathode comprises $M1_YM2_Z(CN)_N \cdot mH_2O$;
   where M1 and M2 are independently selected from the group consisting of transition metals, calcium (Ca), magnesium (Mg), strontium (Sr), and barium (Ba);
   where $Y$ is less than or equal to 1;
   where $Z$ is less than or equal to 1;
   where $N$ is less than or equal to 6;
   where $M$ is less than or equal to 20;
   performing a plurality of initial charge and discharge operations, where a charge operation uses an external power source to create a current from the preloaded anode to the cathode, and a discharge operation connects an external load between the preloaded anode and cathode; and,
   forming an anode comprising $Me_bX$ overlying the current collector in a battery discharge state, where $0 \le b < a$.

2. The method of claim 1 wherein performing the plurality of initial charge and discharge operations includes consuming the metal (Me) in the preloaded anode;
   wherein forming the anode includes forming an anode in the battery charged state comprising $Me_cX$, where $c<a$; and,
   the method further comprising:
   forming solid electrolyte interface (SEI) layers overlying an electrode selected from a group consisting of the anode, the cathode, and both the anode and cathode.

3. The method of claim 1 wherein Me is selected from the group consisting of lithium (Li), sodium (Na), potassium (K), rubidium (Rb), cesium (Cs), calcium (Ca), strontium (Sr), barium (Ba), and magnesium (Mg).

4. The method of claim 1 wherein M1 and M2 are independently selected from the group consisting of titanium (Ti), vanadium (V), chromium (Cr), manganese (Mn), iron (Fe), cobalt (Co), nickel (Ni), copper (Cu), and zinc (Zn).

5. The method of claim 1 further comprising:
   subsequent to performing the plurality of initial charge and discharge operations, forming a cathode in a battery discharged state comprising $Me_XM1_YM2_Z(CN)_N \cdot mH_2O$;
   where x is greater than zero.

6. The method of claim 1 further comprising:
   subsequent to performing the plurality of initial charge and discharge operations, forming an anode in a battery charged state comprising a material selected from the group consisting of X with intercalated Me metal ions and X alloyed with Me metal.

7. The method of claim 1 wherein performing the plurality of initial charge and discharge operations includes not consuming the metal (Me) in the preloaded anode; and,
   wherein forming the anode includes forming an anode in a battery charged state comprising $Me_aX$.

8. A preloaded battery with an anode preloaded with consumable metals, the preloaded battery comprising:
   an electrolyte;
   a preloaded anode comprising:
      a conductive current collector;
      $Me_aX$ overlying the current collector, where X is a material selected from the group consisting of carbon, metals able to be electrochemically alloy with metal (Me), intercalation oxides, electrochemically active organic compounds, and combinations of the above-listed materials, and Me is a metal selected from the group of consisting of alkali metals, alkaline earth metals, silver (Ag), aluminum (Al), and combinations thereof;
   a cathode comprising:
      a conductive current collector;
      $M1_YM2_Z(CN)_N \cdot mH_2O$ overlying the current collector;
      where M1 and M2 are independently selected from the group consisting of transition metals, calcium (Ca), magnesium (Mg), strontium (Sr), and barium (Ba);

where x is less than or equal to 2;
where y is less than or equal to 1;
where z is less than or equal to 1;
where n is less than or equal to 6;
where m is less than or equal to 20;
an ion-permeable membrane immersed in the electrolyte, interposed between the anode and the cathode; and,
wherein the battery is configured such that in a steady state discharged condition occurring after a plurality of initial charge and discharge cycles the anode comprises $Me_bX$ overlying the anode current collector, where $0 \leq b \leq a$.

9. The preloaded battery of claim 8 wherein Me is selected from the group consisting of lithium (Li), sodium (Na), potassium (K), rubidium (Rb), cesium (Cs), calcium (Ca), strontium (Sr), barium (Ba), and magnesium (Mg).

10. The preloaded battery of claim 8 wherein $Me_aX$ is selected from the group consisting of:
  $Li_RVO_2$, where $0<R<1$;
  $Na_SMnO_2$, where $0<s<1$;
  a Na—Sn alloy;
  a mixture of lithium powder and tin particles;
  a mixture of sodium particles and hard carbon powder;
  a compound of hard carbon and lithium;
  a compound of hard carbon and sodium;
  a Li—Sn alloy;
  a Li—Sb alloy;
  a Na—Sb alloy;
  a compound of $Fe_3O_4$ and Li; and,
  a compound of $Fe_3O_4$ and Na.

11. The preloaded battery of claim 8 wherein M1 and M2 are independently selected from a the group consisting of titanium (Ti), vanadium (V), chromium (Cr), manganese (Mn), iron (Fe), cobalt (Co), nickel (Ni), copper (Cu), and zinc (Zn).

12. A battery with a steady state capacity, the battery comprising:
  an electrolyte;
  an anode comprising:
    a conductive current collector;
    wherein the battery is configured such that in an initial condition, $Me_aX$ overlies the current collector, where X is a material selected from the group consisting of carbon, metals able to be electrochemically alloy with metal (Me), intercalation oxides, electrochemically active organic compounds, and combinations of the above-listed materials, and Me is a metal selected from the group consisting of alkali metals, alkaline earth metals, silver (Ag), aluminum (Al), and combinations thereof;
    wherein the battery is configured such that in a steady state discharged condition occurring after a plurality of initial charge and discharge cycles, $Me_bX$ overlies the current collector, where $0 \leq b < a$;
  a cathode comprising:
    a conductive current collector;
    charged in both the initial condition and steady state conditions, $M1_YM2_Z(CN)_N \cdot mH_2O$ overlying the current collector;
    where M1 and M2 are independently selected from the group consisting of transition metals, calcium (Ca), magnesium (Mg), strontium (Sr), and barium (Ba);
    where x is less than or equal to 2;
    where y is less than or equal to 1;
    where z is less than or equal to 1;
    where n is less than or equal to 6;
    where m is less than or equal to 20; and,
  an ion-permeable membrane immersed in the electrolyte, interposed between the anode and the cathode.

13. The battery of claim 12 wherein Me is selected from the group consisting of lithium (Li), sodium (Na), potassium (K), rubidium (Rb), cesium (Cs), calcium (Ca), strontium (Sr), barium (Ba), and magnesium (Mg).

14. The battery of claim 12 wherein $Me_aX$ is selected from the group consisting of:
  $Li_RVO_2$, where $0<R<1$;
  $Na_SMnO_2$, where $0<s<1$;
  a Na—Sn alloy;
  a mixture of lithium powder and tin particles;
  a mixture of sodium particles and hard carbon powder;
  a compound of hard carbon and lithium;
  a compound of hard carbon and sodium;
  a Li—Sn alloy;
  a Li—Sb alloy;
  a Na—Sb alloy;
  a compound of $Fe_3O_4$ and Li; and,
  a compound of $Fe_3O_4$ and Na.

15. The battery of claim 12 wherein M1 and M2 are independently selected from the group consisting of titanium (Ti), vanadium (V), chromium (Cr), manganese (Mn), iron (Fe), cobalt (Co), nickel (Ni), copper (Cu), and zinc (Zn).

16. The battery of claim 12 further comprising:
  wherein the battery is configured such that in the steady state condition, solid electrolyte interface (SEI) layers overlie an electrode selected from the group consisting of the anode, the cathode, and both the anode and cathode; and,
  wherein the battery is configured such that the anode, charged in the steady state condition, comprises $Me_cX$, where $c<a$.

17. The battery of claim 12 wherein the battery is configured such that the cathode, discharged in the steady state condition, comprises:
  $Me_XM1_YM2_Z(CN)_N \cdot mH_2O$;
  where x is greater than zero.

18. The battery of claim 12 wherein the battery is configured such the anode, charged in the steady state condition, comprises a material selected from the group consisting of X with intercalated Me metal ions and X alloyed with Me metal.

19. The battery of claim 12 wherein the battery is configured such that the anode, charged in the steady state condition, and in absence of SEI layers overlying an electrode selected from the group consisting of the anode, the cathode, and both the anode and cathode, comprises $Me_aX$.

* * * * *